United States Patent
Stallings et al.

(10) Patent No.: US 9,678,659 B2
(45) Date of Patent: Jun. 13, 2017

(54) TEXT ENTRY FOR A TOUCH SCREEN

(75) Inventors: Heath Stallings, Colleyville, TX (US); Sok Y. Hwang, Dallas, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1315 days.

(21) Appl. No.: 12/650,683

(22) Filed: Dec. 31, 2009

(65) Prior Publication Data

US 2011/0157028 A1  Jun. 30, 2011

(51) Int. Cl.
*G06F 3/041* (2006.01)
*G06F 3/0488* (2013.01)

(52) U.S. Cl.
CPC ..... *G06F 3/04883* (2013.01); *H04M 2250/22* (2013.01)

(58) Field of Classification Search
USPC .......................................... 345/170–176, 179
See application file for complete search history.

(56) References Cited

U.S. PATENT DOCUMENTS

| 5,805,161 | A | * | 9/1998 | Tiphane | 715/786 |
| 6,088,481 | A | * | 7/2000 | Okamoto et al. | 382/189 |
| 2005/0022130 | A1 | * | 1/2005 | Fabritius | 715/739 |
| 2005/0088418 | A1 | * | 4/2005 | Nguyen | 345/173 |
| 2006/0279559 | A1 | * | 12/2006 | Kongqiao et al. | 345/179 |
| 2008/0165142 | A1 | * | 7/2008 | Kocienda et al. | 345/173 |
| 2009/0048000 | A1 | * | 2/2009 | Ade-Hall | 455/566 |
| 2011/0018812 | A1 | * | 1/2011 | Baird | 345/173 |

* cited by examiner

Primary Examiner — Tony Davis

(57) ABSTRACT

A device includes a memory to store multiple instructions, a touch-sensitive display, and a processor. The processor executes instructions in the memory to present, on the touch-sensitive display, an application display window; detect a touch on the application display window; display a handwriting input window based on the touch on the application display window, where the handwriting input window includes a magnified view of a portion of the application display window and where the handwriting input window is substantially centered at the location of the touch; detect a touch path input within the handwriting input window; display the touch path input within the handwriting input window; recognize that the touch path input has been removed from the handwriting input window; and present, on the touch-sensitive display, the application display window including the displayed touch path input, after the handwriting input window has been removed.

20 Claims, 9 Drawing Sheets

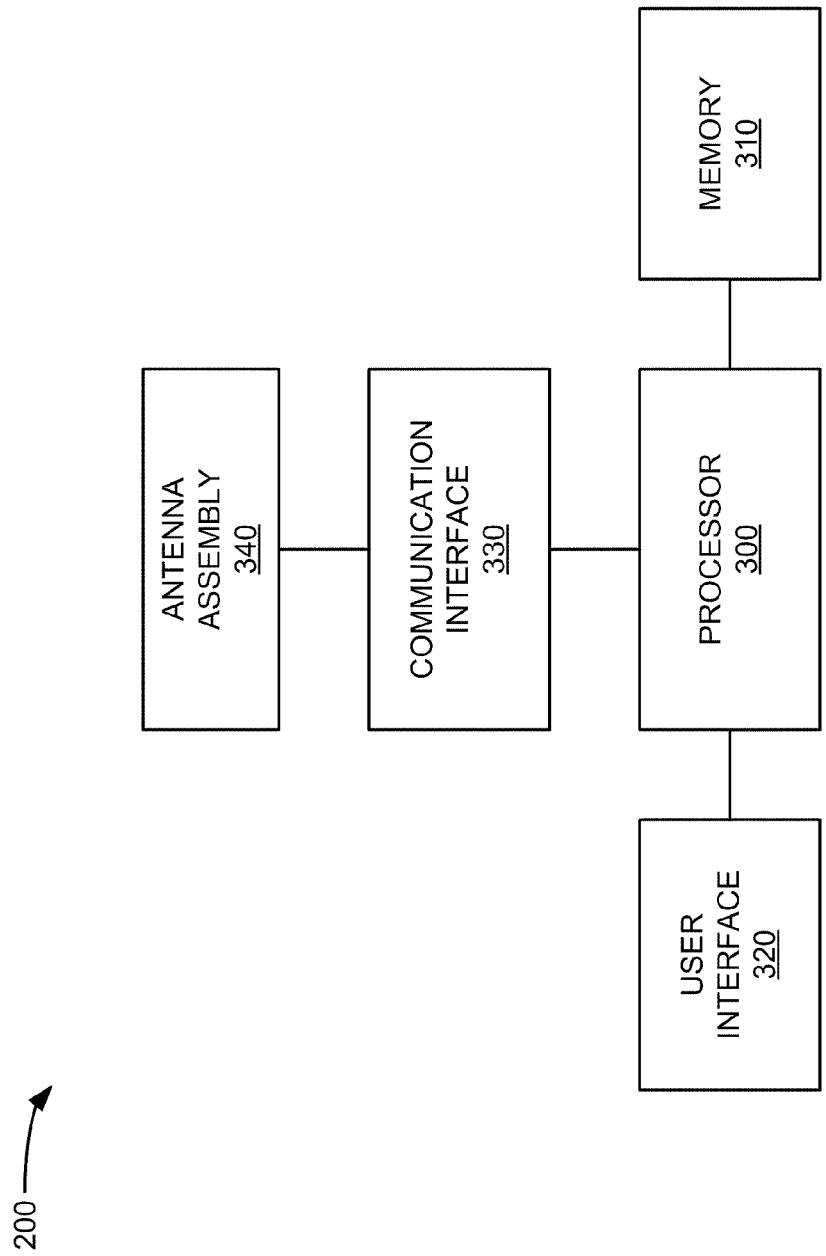

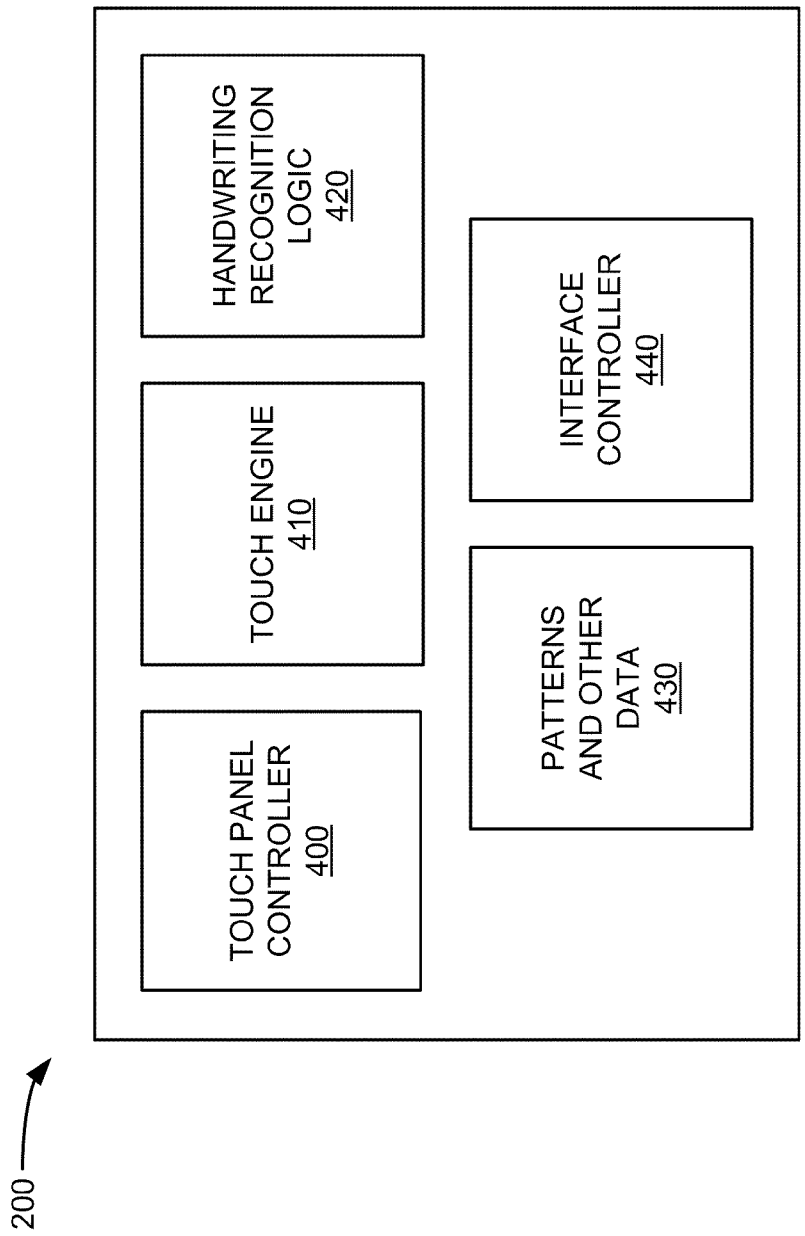

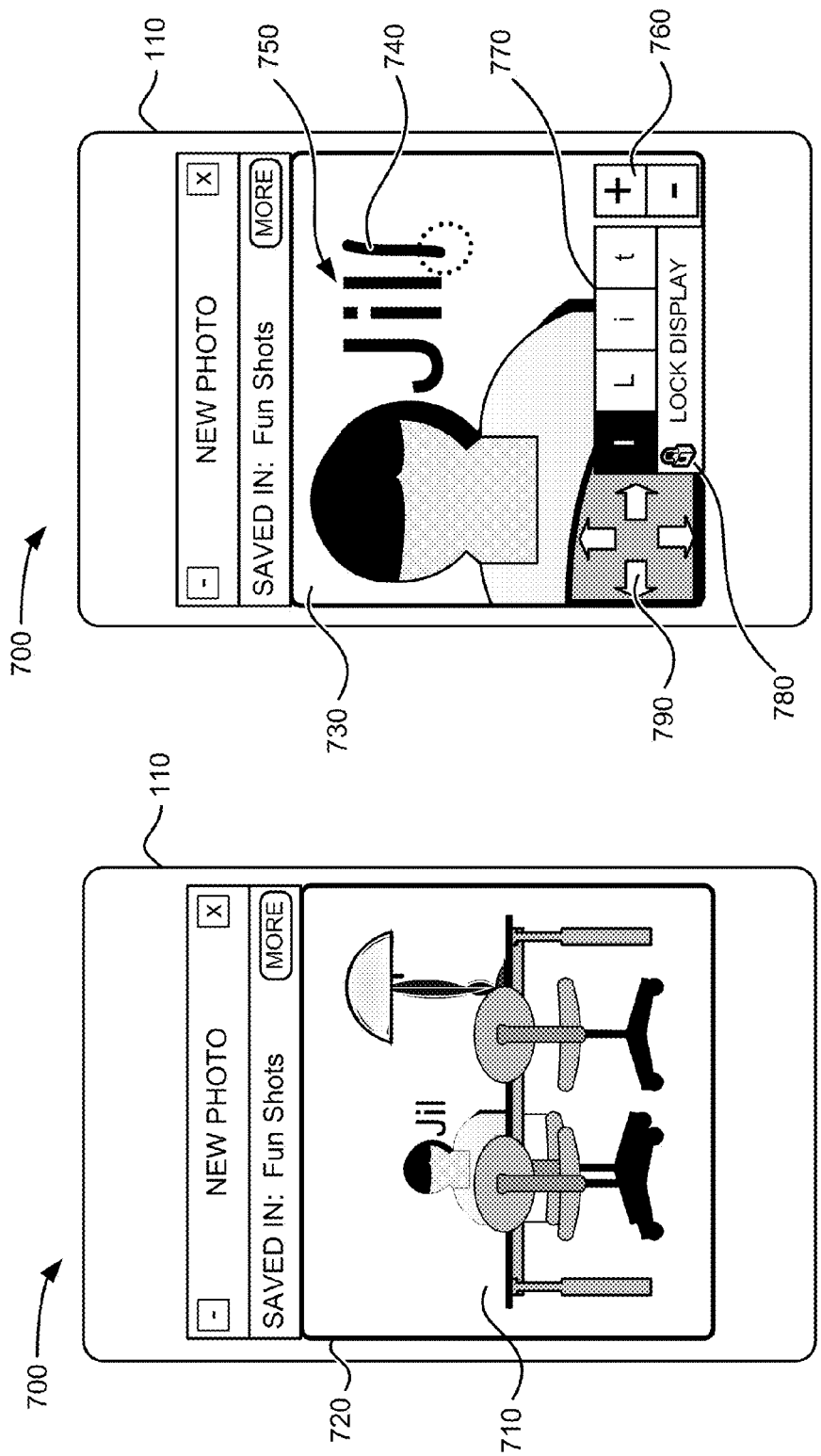

TEXT ENTRY FOR A TOUCH SCREEN

BACKGROUND

Some mobile devices provide a touch screen user interface that eliminates a physical keyboard/keypad. While the physical keyboard has been replaced in some instances with a virtual keyboard, text input using character recognition may be preferred in some applications. Capacitive touch screens typically rely on current from a body part (e.g., a finger) to receive user input. However, a finger generally lacks the precision required for writing characters in the relatively small areas provided on a mobile device. More precise devices for writing characters, such as a stylus or even a fingernail, cannot be used as an input device on capacitive touch screens.

BRIEF DESCRIPTION OF THE DRAWINGS

FIG. 3 depicts a diagram of exemplary components of the device illustrated in FIG. 2;

FIG. 4 depicts a diagram of exemplary functional components of the device illustrated in FIG. 2;

FIGS. 7A-7B provide illustrations of another exemplary implementation of a text-entry interface for a touch screen.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide a handwriting interface to enable text entry on a touch screen without use of a keyboard. When in a text entry mode, the handwriting interface may zoom in as a user's touch is detected to allow fingertip writing and to show characters appearing as written. When the user's touch is removed, the interface may zoom back out to show the full text as entered at an actual scale. In some implementations, character recognition tools may also be included to convert fingertip writing to digital text.

Figure 1:
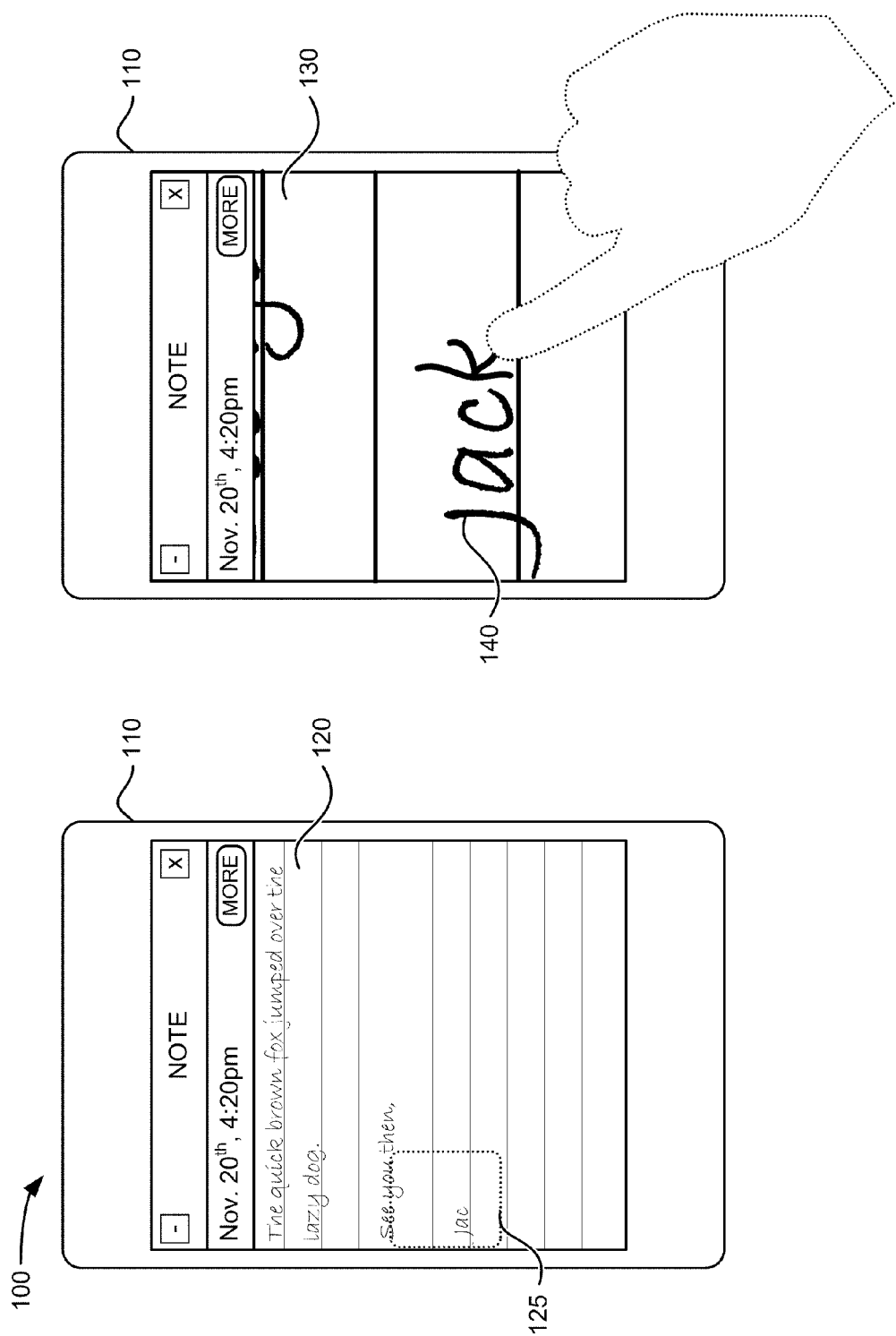
FIGS. 1A and 1B are diagrams illustrating an exemplary implementation of a text-entry interface for a touch screen.

FIGS. 1A and 1B provide diagrams illustrating an exemplary implementation of a handwriting interface 100 for a touch screen. Referring collectively to FIGS. 1A and 1B, handwriting interface 100 may include a touch screen 110, an application display window 120, and a handwriting input window 130. FIG. 1A provides a diagram of application display window 120 with an indication of a portion 125 defining an initial region to be magnified for text input. FIG. 1B provides a diagram of a handwriting input window 130 that includes portion 125. Handwritten objects 140 may be shown on touch screen 110 within application display window 120 and handwriting input window 130 based on user input.

Touch screen 110 may include hardware or a combination of hardware and software that can be used to display images to a user of drawing interface 100 and to receive user input in association with the displayed images. For example, application display window 120, handwriting input window 130, handwritten objects 140, images, backgrounds, icons, virtual keys, or other graphical elements may be displayed via touch screen 110. As described further herein, touch screen 110 may include a touch panel to receive user input via a touch on a surface of touch screen 110.

Referring to FIG. 1A, application display window 120 may include a display for a text-based, image-based, or other software program. For example, application display window 120 may include an interface for a Multimedia Messaging Service (MMS) application, an email application, a word processing application, a game application, an image-viewing application, a document-viewing application, a map application, a desktop note application, a text message application, or another application that may allow user input of text or an overlay of handwritten text. In one implementation, application display window 120 may toggle between a conventional mode and a text entry mode. The conventional mode may receive touch input on application display window 120 as a command for an application displayed in application display window 120. The text entry mode may receive touch input on application display window 120 as a command signal to zoom in (i.e., enlarge) a portion of application display window 120 in the vicinity of the touch (e.g., as indicated by portion 125). Upon receiving a touch, while in text entry mode, handwriting interface 100 may replace application display window 120 with handwriting input window 130 (FIG. 1B).

Referring to FIG. 1B, handwriting input window 130 may display a magnified portion (e.g., portion 125) of application display window 120. Handwriting input window 130 may provide sufficient magnification to enable fingertip text entry by a user using touch screen 110. The fingertip text entry may be displayed within handwriting input window 130. In some implementations, handwriting input window 130 may include an integrated character recognition portion including tools to convert written characters into digital text. As shown in the implementation of FIG. 1B, handwriting input window 130 may entirely cover application display window 120. In other implementations, handwriting input window 130 may be overlaid on application display window 120 and may be smaller in size than application display window 120. In another exemplary implementation, a portion of the background of handwriting input window 130 may be semi-transparent to maintain conceptual association with application display window 120.

Handwriting input window 130 may remain displayed while the touch remains in contact with touch screen 110. In some implementations, handwriting input window 130 may remain displayed/active for a short interval (e.g., less than 500 milliseconds, less than 1 second, or another interval) after removal of the touch to allow for text entry manipulations by a user, such as multi-stroke characters or adjustment of the display of handwriting input window 130. Handwriting input window 130 may also pan automatically (e.g., when a user removes a touch for a short interval) to prevent handwriting input from running into an edge of touch screen 110. When the user removes a touch for longer than a particular short interval (e.g., more than 500 milliseconds, less than 1 second, or another interval), handwriting input window 130 may be removed from display on touch screen 110 and application display window 120 may be shown including the handwritten text shown to scale with other information in application display window 120.

Although FIGS. 1A-1B show an exemplary handwriting interface 100, in other implementations, handwriting interface 100 may contain fewer, different, differently arranged, or additional items than depicted in FIGS. 1A-1B. For example, handwriting interface 100 may include additional icons/options to facilitate a user input, such as character recognition options, magnification options, window-size (e.g., handwriting input window 130) options, etc. In other implementations, application display window 120 and handwriting input window 130 may employ magnification indicators (e.g., 50%, 100%, 400%, 800%, etc.) or backgrounds (e.g., textures, lines, grids, patterns, watermarks, etc.) that can be magnified to help represent current magnification levels to a user.

Figure 2:
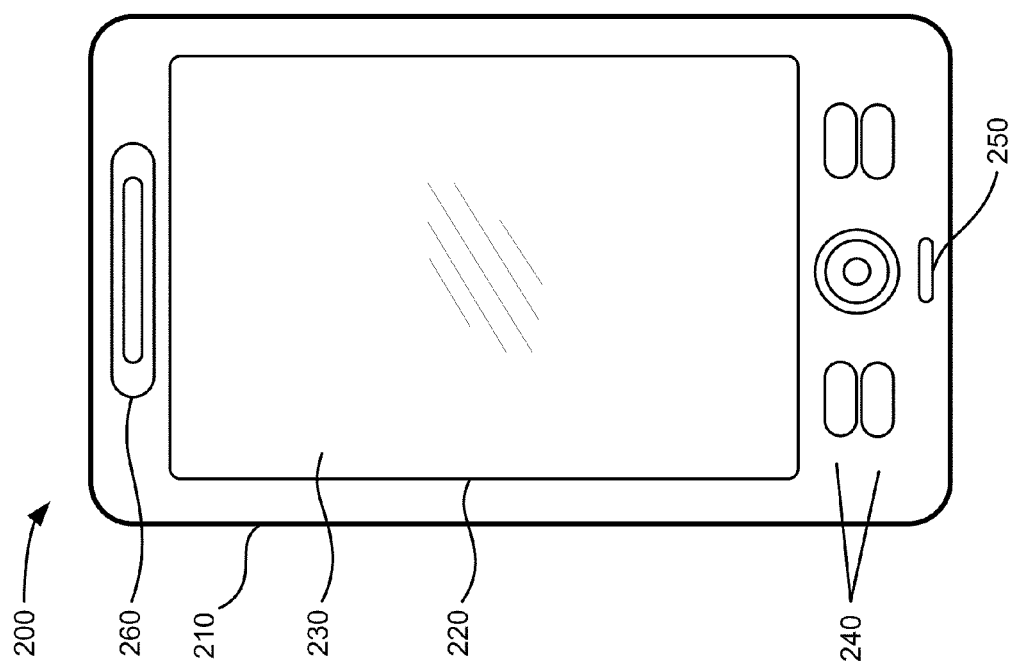
FIG. 2 depicts a diagram of an exemplary device in which systems and/or methods described herein may be implemented.

FIG. 2 is a diagram of an exemplary device 200 in which systems and/or methods described herein may be implemented. Device 200 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a portable gaming system, a personal computer, a laptop computer, a tablet device and/or any other device capable of utilizing a touch screen display.

As illustrated in FIG. 2, device 200 may include a housing 210, a display 220, a touch panel 230, control buttons 240, a microphone 250, and/or a speaker 260. Housing 210 may protect the components of device 200 from outside elements. Housing 210 may include a structure configured to hold devices and components used in device 200, and may be formed from a variety of materials. For example, housing 210 may be formed from plastic, metal, or a composite, and may be configured to support display 220, touch panel 230, control buttons 240, microphone 250, and/or speaker 260.

Display 220 may provide visual information to the user. For example, display 220 may display text input into device 200, text, images, video, and/or graphics received from another device, and/or information regarding incoming or outgoing calls or text messages, emails, media, games, phone books, address books, the current time, etc. For example, display 220 may include a liquid crystal display (LCD), such as a thin film transistor (TFT) LCD, etc.

As shown in FIG. 2, touch panel 230 may be integrated with and/or overlaid on display 220 to form a touch screen (e.g., touch screen 110) or a panel-enabled display that may function as a user input interface. For example, in one implementation, touch panel 230 may include near field-sensitive (e.g., capacitive) technology, acoustically-sensitive (e.g., surface acoustic wave) technology, photo-sensitive (e.g., infra-red) technology, pressure-sensitive (e.g., resistive) technology, force-detection technology, and/or any other type of touch panel overlay that allows display 220 to be used as an input device. Generally, touch panel 230 may include any kind of technology that provides the ability to identify a touch path and/or a sequence of touches that are registered on the surface of touch panel 230. A touch path may include, for example, a connected group of touch coordinates created by dragging a touch along a touch panel (e.g., touch panel 230). Touch panel 230 may also include the ability to identify movement of a body part or a pointing device as it moves on or near the surface of touch panel 230.

In one implementation, touch panel 230 may include a capacitive touch overlay including multiple touch sensing points capable of sensing a touch. An object having capacitance (e.g., a user's finger) may be placed on or near touch panel 230 to form a capacitance between the object and one or more of the touch sensing points. The amount and location of touch sensing points may be used to determine touch coordinates (e.g., location and dimensions) of the touch. The touch coordinates may be associated with a portion of display 220 having corresponding coordinates. In other implementations, touch panel 230 may include projection scanning technology, such as infra-red touch panels or surface acoustic wave panels that can identify, for example, dimensions of a human touch on the touch panel. For either infra-red or surface acoustic wave panels, the number of horizontal and vertical sensors (e.g., acoustic or light sensors) detecting the touch may be used to approximate the location of a touch.

Control buttons 240 may permit the user to interact with device 200 to cause device 200 to perform one or more operations. For example, control buttons 240 may be used to cause device 200 to transmit information and/or to activate handwriting interface 100 on display 220. In one implementation, one or more control buttons 240 may be used to activate/deactivate a text mode for device 100.

Microphone 250 may receive audible information from the user. For example, microphone 250 may receive audio signals from the user and may output electrical signals corresponding to the received audio signals. Speaker 260 may provide audible information to a user of device 200. Speaker 260 may be located in an upper portion of device 200, and may function as an ear piece when a user is engaged in a communication session using device 200. Speaker 260 may also function as an output device for music and/or audio information associated with, for example, games and/or video images played on device 200.

Although FIG. 2 shows exemplary components of device 200, in other implementations, device 200 may contain fewer, different, differently arranged, or additional components than depicted in FIG. 2. In still other implementations, a component of device 200 may perform one or more tasks described as being performed by another component of user device 200.

FIG. 3 is a diagram of exemplary components of device 200. As illustrated, device 200 may include a processor 300, a memory 310, a user interface 320, a communication interface 330, and/or an antenna assembly 340.

Processor 300 may include one or more microprocessors, application specific integrated circuits (ASICs), field programmable gate arrays (FPGAs), or the like. Processor 300 may control operation of device 200 and its components. In one implementation, processor 300 may control operation of components of device 200 in a manner described herein.

Memory 310 may include a random access memory (RAM), a read-only memory (ROM), and/or another type of memory to store data and instructions that may be used by processor 300. In one implementation, memory 310 may store data used to display a graphical user interface, such as handwriting interface 100 on display 220.

User interface 320 may include mechanisms for inputting information to device 200 and/or for outputting information from device 200. Examples of input and output mechanisms might include buttons (e.g., control buttons 240, keys of a keypad, a joystick, etc.); a speaker (e.g., speaker 260) to receive electrical signals and output audio signals; a microphone (e.g., microphone 250) to receive audio signals and output electrical signals; a display (e.g., display 220/touch panel 230) to receive touch input and/or to output visual information; a vibrator to cause device 200 to vibrate; and/or a camera to receive video and/or images.

Communication interface 330 may include, for example, a transmitter that may convert baseband signals from processor 300 to radio frequency (RF) signals and/or a receiver that may convert RF signals to baseband signals. Alternatively, communication interface 330 may include a transceiver to perform functions of both a transmitter and a receiver. Communication interface 330 may connect to antenna assembly 340 for transmission and/or reception of the RF signals.

Antenna assembly 340 may include one or more antennas to transmit and/or receive RF signals over the air. Antenna assembly 340 may, for example, receive RF signals from communication interface 330 and transmit them over the air, and receive RF signals over the air and provide them to communication interface 330. In one implementation, for example, communication interface 330 may communicate with a network and/or devices connected to a network.

As will be described in detail below, device 200 may perform certain operations described herein in response to processor 300 executing software instructions of an application contained in a computer-readable medium, such as memory 310. A computer-readable medium may be defined as a physical or logical memory device. A logical memory device may include a space within a single physical memory device or spread across multiple physical memory devices. The software instructions may be read into memory 310 from another computer-readable medium or from another device via communication interface 330. The software instructions contained in memory 310 may cause processor 300 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 200, in other implementations, device 200 may contain fewer, different, differently arranged, or additional components than depicted in FIG. 3. In still other implementations, a component of device 200 may perform one or more other tasks described as being performed by another component of device 200.

FIG. 4 provides a diagram of exemplary functional components of device 200. As shown, device 200 may include touch panel controller 400, touch engine 410, handwriting recognition logic 420, patterns and other data 430, and interface controller 440.

Touch panel controller 400 may include hardware or a combination of hardware and software to identify touch coordinates from touch panel 230. Coordinates from touch panel controller 400, including the identity of particular sensors in, for example, the X and Y dimensions, may be passed on to touch engine 410 to associate the touch coordinates with a location and/or image to be displayed on display 220. For example, touch panel controller 400 may identify which sensors may indicate a touch on touch panel 230 and the location of the sensors registering the touch. In one implementation, touch panel controller 400 may be included, for example, as part of processor 300.

Touch engine 410 may include hardware or a combination of hardware and software for processing signals that are received at touch panel controller 400. More specifically, touch engine 410 may use the signal received from touch panel controller 400 to detect touches on touch panel 230 and determine commands associated with the touches and/or dimensions, locations, and/or paths of the touches. In one implementation, touch input may be interpreted as a graphical input (e.g., displayed as an image of handwritten text). In other implementations, touch input may be processed for conversion to digital text. For example, when detecting a touch within a character recognition portion of handwriting input window 130, touch engine 410 may use information from touch panel controller 400 to determine a path of a touch. In one implementation, touch engine 410 may associate a series of touch paths based, for example, on a maximum time interval between touches. For example, a second touch that a user initiates within less than a particular time (e.g., half a second) after the end of a previous touch may be associated with the first touch. As described further herein, in some implementations, the touch path may be used to determine a character input (e.g., a letter, number, etc.) associated with the touch or with a related sequence of touches. In one implementation, touch engine 410 may be included, for example, as part of processor 300.

Handwriting recognition logic 420 may include hardware or a combination of hardware and software to interpret a touch path or groups of associated touch paths based on signals from touch engine 410. For example, in response to touch path signals that are received from touch engine 410, handwriting recognition logic 420 may interpret the touch path as a character and translate the touch path into digital text. Handwriting recognition logic 420 may also initiate a display of pixels (e.g., on display 220) associated the touch path to allow a user to visualize the touch input. Handwriting recognition logic 420 may be included, for example, as part of processor 300.

Patterns and other data 430 may include, for example, character patterns, word patterns, user preferences, and/or other data. Character patterns and word patterns may include stored pixel patterns that correspond to known characters and/or groups of characters. Handwriting recognition logic 420 may, for example, compare a touch path from a user input with the pixel patterns to interpret the touch path as a character or word. User preferences may include, for example, preferences for handwriting settings and features, such as menu arrangements, default magnification levels, user shortcuts, time intervals for associating touch paths, etc. Other data may include, for example, data for predictive text, templates for handwriting interface 100, backgrounds, transparency settings, etc. Patterns and other data 430 may be included, for example, in memory 310 and act as an information repository for handwriting recognition logic 420 and/or interface controller 440.

Interface controller 440 may include hardware or a combination of hardware and software to activate and deactivate handwriting input window 130. For example, interface controller 440 may identify a command signal (e.g., from a control button 240 or a touch command) to enable/disable a text entry mode. When the text entry mode is enabled, interface controller 440 may also activate handwriting input window 130 based on receiving a signal from touch panel controller 400 indicating a touch on application display window 120. Alternatively, when handwriting input window 130 is activated, interface controller may receive a signal from touch panel controller 440 indicating a touch has been removed from handwriting input window 130. In one implementation, interface controller 440 may interpret intervals between touches to determine whether a subsequent touch should be related to a previous touch (e.g., to form a character from multiple touch paths) or whether to close (upon removal) and open (upon registering the subsequent touch) handwriting input window 130. In an exemplary implementation, interface controller 440 may also provide digital text identified in handwriting input window 130 to application display window 120.

Although FIG. 4 shows exemplary functional components of device 200, in other implementations, device 200 may contain fewer, different, differently arranged, or additional functional components than depicted in FIG. 4. In still other implementations, a functional component of device 200 may perform one or more tasks described as being performed by another functional component of device 200.

Figure 5A:
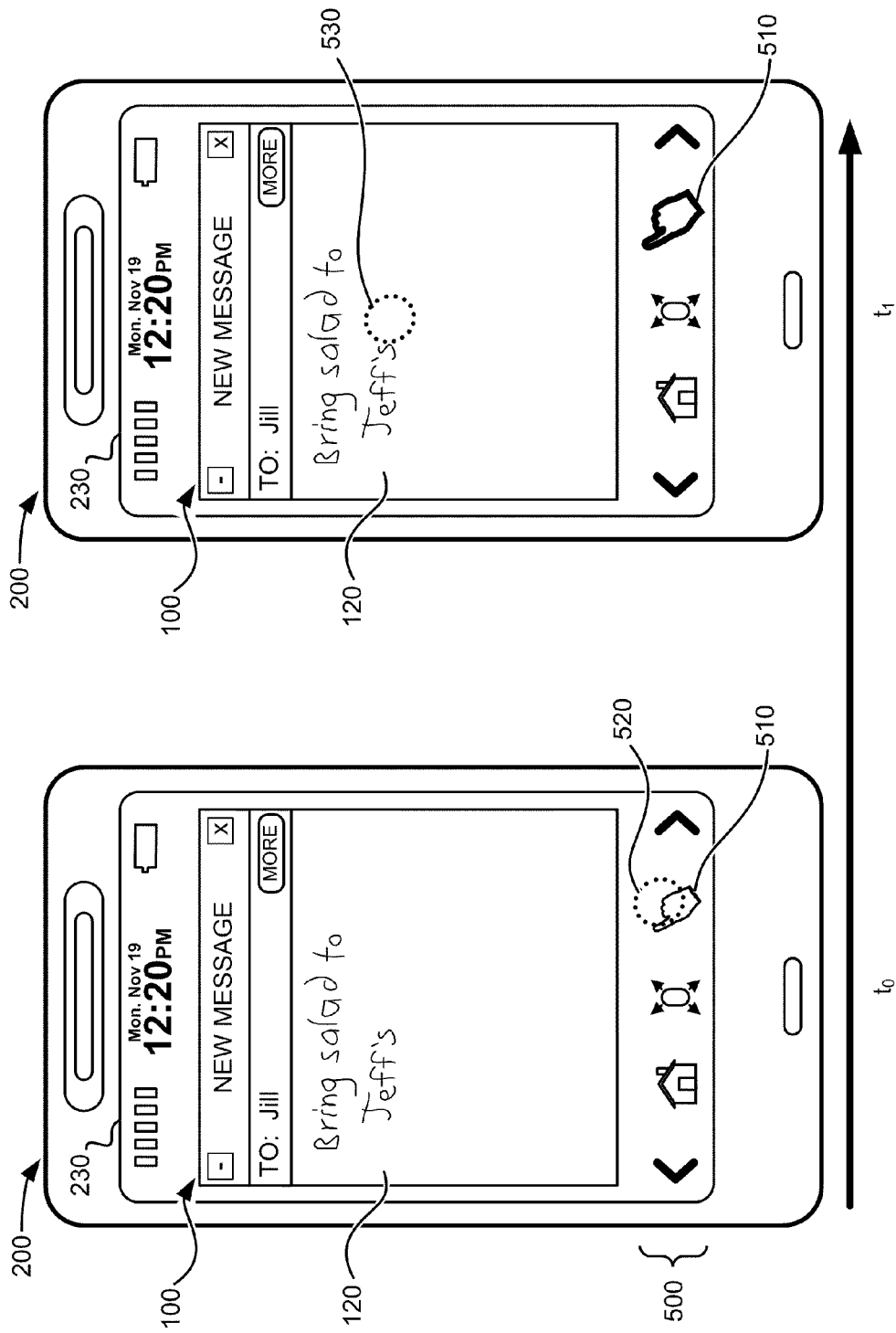
FIGS. 5A-5C illustrate exemplary text-entry operations on the device depicted in FIG. 2.
Figure 5B:
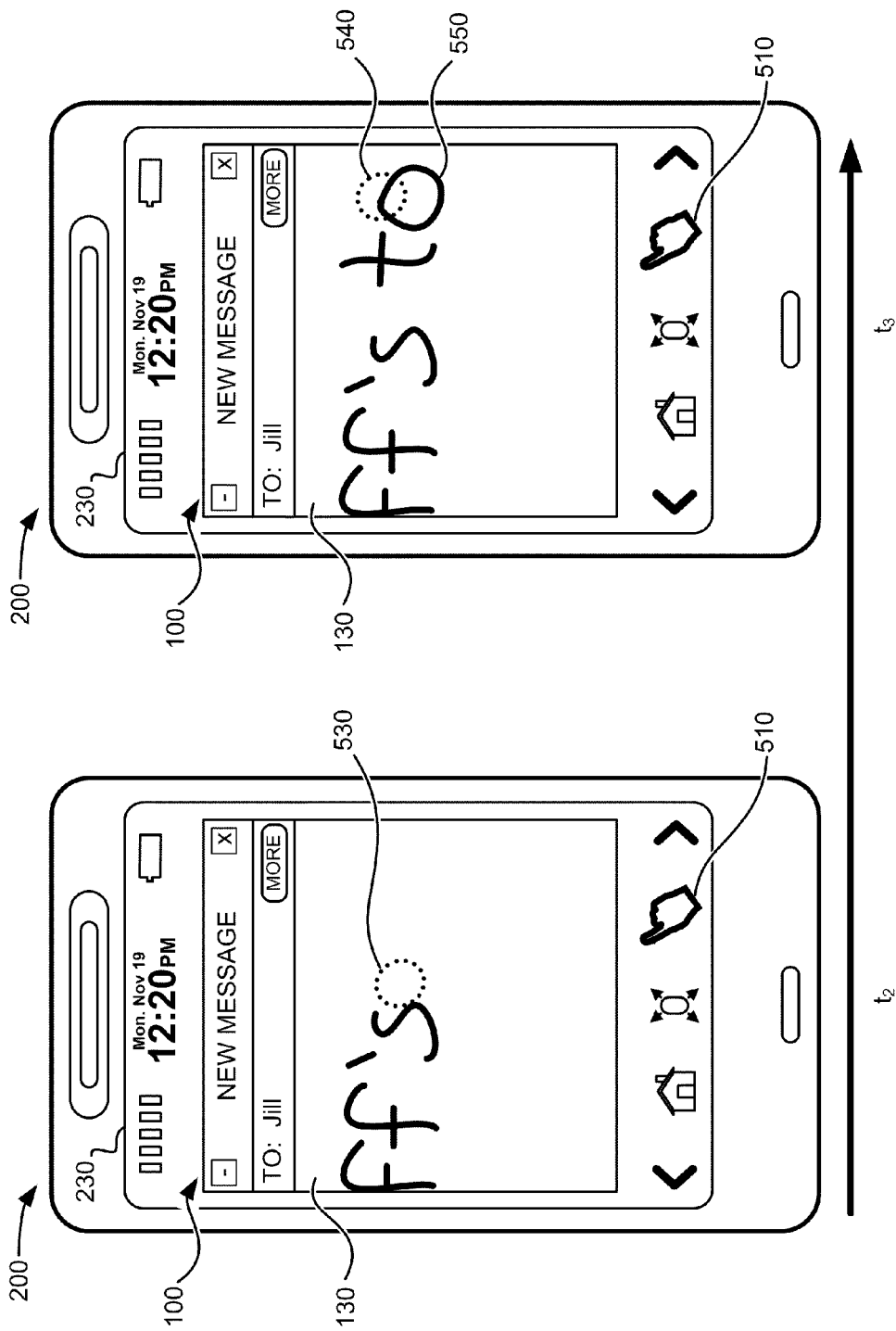
Figure 5C:
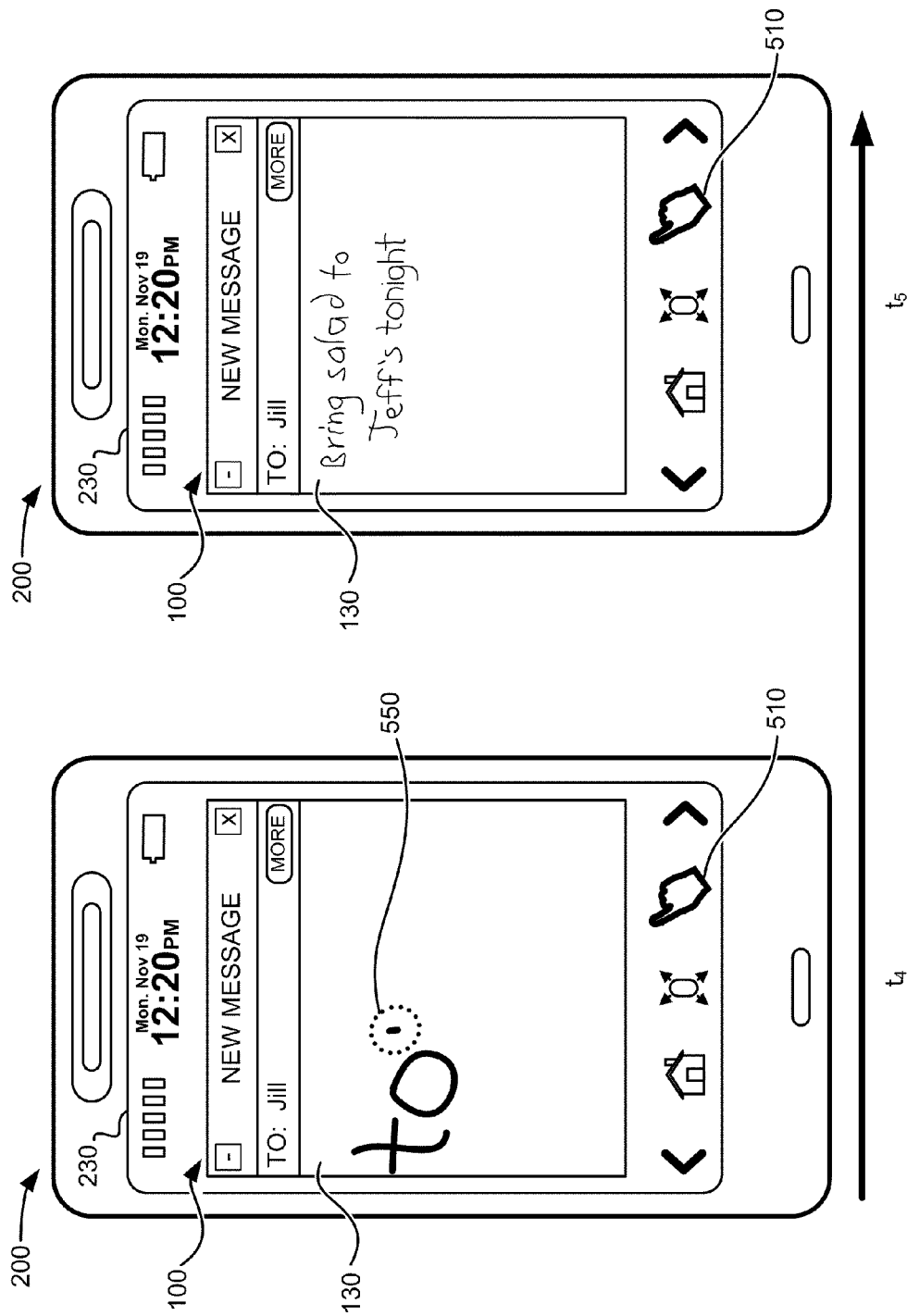

FIGS. 5A-5C illustrate exemplary text entry operations capable of being performed by a device, such as device 200. In FIGS. 5A-5C, a touch screen (e.g., touch screen 110 that includes display 220 and touch panel 230) with a handwriting interface 100 is shown as a function of time progressing from time $t_0$ to time $t_5$. The touch screen may generally include a surface configured to detect a touch at one or more sensing nodes. In one implementation, the surface may include sensing nodes using a grid arrangement of transparent conductors to track approximate horizontal and vertical positions. In other implementations, other arrangements of sensing nodes may be used, including polar coordinates, parabolic coordinates, non-standard coordinates, etc. The number and configuration of sensing nodes may vary depending on the required accuracy/sensitivity of the touch screen. Generally, more sensing nodes can increase accuracy/sensitivity of the touch screen. A signal may be produced when a capacitive object (e.g., a user's finger) touches a region of the surface over a sensing node. Each sensing node may represent a different position on the surface of the touch screen, and each sensing node may be capable of generating a signal at the same time.

FIG. 5A provides a view of handwriting interface 100 at times $t_0$ and $t_1$. At time $t_0$, handwriting interface 100 may be displayed including application display window 120 and a group of command icons 500. Application display window 120 may include a graphical user interface for a program, such as a communication program, word processing program, note pad, document display program, or other program that accepts text and/or graphical input. While application display window 120 is shown with some text already entered in FIG. 5A, application display window 120 may also include no text at time $t_0$. Command icons 500 may include a text entry mode icon 510 that may allow a user to toggle between a conventional touch interface mode and a text entry mode. In other implementations, other mechanisms (e.g., control buttons 240 (not shown) or other touch input commands) may be used to activate/deactivate the text entry mode. Also, at time $t_0$, a user may apply a touch 520 to text entry mode icon 510 to activate the text entry mode.

At time $t_1$, a user may apply a touch 530 generally to application display window 120 to input text using, for example, a finger. The text entry mode may be active, as indicated, for example, by enlargement of text entry mode icon 510. In other implementations, the text entry mode may be indicated by other techniques, including other alterations to text entry mode icon 510 or a separate indication elsewhere on handwriting interface 100. In one implementation, the location of touch 530 may provide a centering point for automatic magnification of a portion of application display window 120. In other implementations, automatic magnification may be independent of the location of touch 530, such that handwriting interface 100 may default to magnify an end portion of previously entered text, a top-right corner of application display window 120, a center of application display window 120, or another location.

FIG. 5B provides a view of handwriting interface 100 at times $t_2$ and $t_3$. Touch 530 may activate handwriting input window 130, which may be displayed at time $t_2$. A portion of the text in application display window 120 may be enlarged and displayed within handwriting input window 130. The amount of enlargement may be sufficient to permit fingertip writing within handwriting input window 130. For example, handwriting input window 130 may enlarge a portion of application display window 120 about 400 percent to 800 percent. In some implementations, the amount of enlargement within handwriting input window 130 may be user configurable.

At time $t_3$, a user may apply a touch 540 to handwriting input window 130 to provide text input 550 (e.g., to write text) using, for example, a fingertip. Text input 550 may be determined based on the sensing nodes within the area of the touch (e.g., touch 540). In the example of FIG. 5B, the number and location of sensing nodes within touch 540 may be calculated to represent a touch on a particular portion of touch screen 110. In an exemplary implementation, the locations of each of the sensing nodes within touch 540 may be averaged to determine a central touch point that is smaller than the area of touch 540. Thus, the displayed width of a touch path for text input 550 may be narrower than a diameter of touch 540. In other implementations, the entire area within touch 540 may be used to form a touch path for text input 550.

As the user's fingertip approaches an edge of handwriting input window 130, handwriting interface 100 may sense the location of the touch (e.g., touch 540) and pan the magnified area of handwriting input window 130 to enable continued text entry without closing/re-opening handwriting input window 130. In one implementation, handwriting input window 130 may pan when touch 540 is removed.

FIG. 5C provides a view of handwriting interface 100 at times $t_4$ and $t_5$. Touch 540 may be removed and a subsequent touch 550 may be applied at time $t_4$. As shown in FIG. 5C, the magnified area of handwriting input window 130 may pan (e.g., pan to the left) during the interval between touch $t_3$ and $t_4$. The resulting display of handwriting input window 130 may result in a projected next input location being located near a center or left side of handwriting input window 130. A projected next input location may be based on, for example, a designated natural language (e.g., English, Chinese, Arabic, etc.) for device 200, a text entry trend (e.g., from left to right), and/or space constraints (e.g., end of a line of text). In one implementation, handwriting input window 130 may temporarily block user input during a pan operation to prevent erroneous marks and/or unintended character spacing. Thus, at time $t_4$, a user may apply touch 550 in a central region of handwriting input window 130.

At time $t_5$, touch 550 may have been removed such that an additional touch does not occur for a particular interval (e.g., more than about 300-1000 milliseconds). After the particular interval, at time $t_5$, handwriting interface 100 may return to application display window 120 to show the complete handwritten text (or a portion of the complete text) relative to the size of other objects in application display window 120. Application display window 120 may be presented, for example, at a scale previously shown before handwriting input window 130 was displayed. Thus, application display window 120 may present the combine objects and handwritten text within application display window 120 at a reduced scale (e.g., less than 100%), larger scale (e.g., greater than 100%), or true size (e.g., 100%). A user may touch application display window 120 (e.g., triggering handwriting input window 130) to enter more text or deactivate the text entry mode by selecting text entry mode icon 510.

Although FIGS. 5A-5C show an exemplary sequence of user touches and resulting actions by handwriting interface 100, in other implementations, other techniques may be used to accept fingertip writing input.

Figure 6:
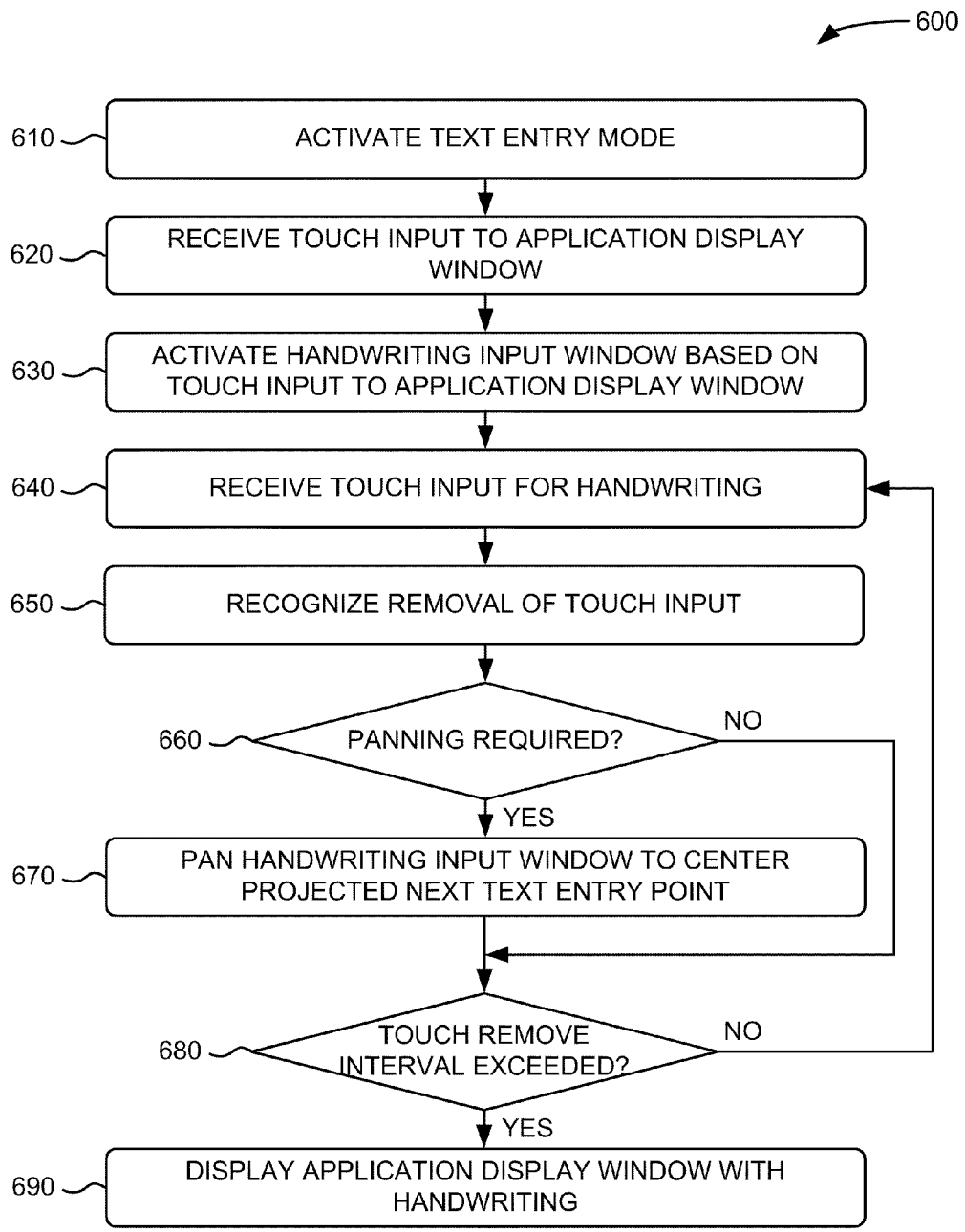
FIG. 6 depicts a flow chart of an exemplary process for fingertip text entry on a touch screen according to implementations described herein.

FIG. 6 depicts a flow chart of an exemplary process 600 for fingertip text entry on a touch screen according to implementations described herein. Process 600 may be performed in conjunction with a user providing textual input for an application display window (e.g., application display window 120), such as an interface for a MMS application, an email application, a word processing application, a gaming application, or an image-viewing application, a map application, a desktop note application, or another application that may allow user input of text or an overlay of handwritten text. In one implementation, process 600 may be performed by device 200. In other implementations, all or part of process 600 may be performed without device 200.

Process 600 may include activating a text entry mode (block 610) and receiving touch input to an application display window (block 620). For example, device 200 may receive user input to activate text entry mode via a control button (e.g., one of control buttons 240) and/or a selection of a touch interface icon (e.g., text entry mode icon 510). Based on the user input, device 200 may activate a text entry mode that provides a magnified text entry window to receive text (fingertip handwriting) input. Once the text entry mode is activated, a user may provide a second touch input on the application display window. For example, device 200 (e.g., touch controller 400) may detect a touch from a user's finger on a capacitive touch panel (e.g., touch panel 230). The touch may trigger one or more sensors within the touch panel that allow device 200 to approximate a touch area in a particular location of the touch screen. In one implementation, the second touch input may be located generally in the area of the application display window where the user intends to enter text.

A handwriting input window may be activated based on the touch input to the application display window (block 630). For example, device 200 may activate handwriting input window 130. As described above in connection with FIG. 1B, handwriting input window 130 may display a magnified portion of application display window 120. Handwriting input window 130 may provide sufficient magnification to enable fingertip text entry by a user using touch screen 110 (e.g., 400%, 600%, 800% or greater magnification). In one implementation, handwriting input window 130 may display a portion of application display window 120 associated with the location of the second touch input.

Touch input for handwriting may be received (block 640). For example, device 200 may receive another touch input to provide text from a fingertip (or another capacitive object). In one implementation, the touch input for handwriting may be the same touch (e.g., touch 530 of FIGS. 5A-5B) that caused device 200 to activate handwriting input window 130. In another implementation, the touch input for handwriting may be a separate touch (e.g., touch 540 of FIG. 5B) provided within a particular interval (e.g., less than 500 milliseconds) of the touch that caused device 200 to activate handwriting input window 130. Thus, as described further herein, touch input for handwriting may include a single touch path (e.g., script handwriting) or multiple touch paths provided with short intervals between touches (e.g., printing, multiple letters/words, etc.)

Removal of the touch input may be recognized (block 650) and it may be determined if panning is required (block 660). For example, device 200 may detect the removal a fingertip from the surface of touch screen 110. Device 200 may identify the last location of the touch and determine, based on, e.g., the relation of the touch location to the edge of handwriting input window 130, whether handwriting input window 130 should pan to another portion of application display window 120.

If it is determined that panning is required (block 660—YES), the handwriting input window may be panned to center a projected next text entry point (block 670). For example, as described in connection with FIGS. 5B-5C, device 200 may pan handwriting input window 130 so that a projected next input location is near the center of handwriting input window 130. In other implementations, handwriting input window 130 may be panned so that a projected next input location is in another location (e.g., center of left side, top left corner, top right corner, etc.) of handwriting input window 130.

If the handwriting input window is panned, or if it is determined that panning is not required (block 660—NO), it may be determined if a touch removal interval is exceeded (block 680). For example, as described above in connection with FIG. 5C, device 200 may determine if a touch is not present on handwriting input window 130 for more than a particular interval (e.g., more than about 300-1000 milliseconds).

If a touch removal interval is not exceeded (block 680—NO), process 600 may return to block 640 to receive additional touch input for handwriting. If a touch removal interval is exceeded (block 680—YES), the application display window may be displayed with handwriting (block 690). For example, as described above in connection with FIG. 5C, device 200 may display application display window 120 with a scale adequate to display some or all of the entered text and other information included in display window 120.

FIGS. 7A and 7B provide diagrams illustrating another exemplary implementation of a handwriting interface 700 for a touch screen. Referring collectively to FIGS. 7A and 7B, handwriting interface 700 may include a touch screen 110, an image 710 within a display window 720, and a handwriting input window 730. Handwritten objects 740 and some converted objects 750 may be shown on touch screen 110 within handwriting input window 730 based on user input. Handwriting input window 730 may also include magnification controls 760, character recognition tools 770, display lock icon 780, and/or panning controls 790. Handwriting input window 730 may be activated from display window 720 in a manner similar to that of application display window 120 and handwriting input window 130 described above.

Handwritten objects 740 may include characters, words, symbols, and/or commands provided by a user. For example, handwritten objects 740 may include a character or series of characters that may be interpreted by handwriting recognition software within device 200 as digital text. In another implementation, handwritten objects 740 may include symbols or commands that may be interpreted by device 200 as an instruction. For example, depending on the information/application within display window 720, a handwritten image of a clock and clock hands may be used to indicate an appointment, or a backwards "C" may be used to indicate a contact name to associate with a displayed object in display window 720.

In an exemplary implementation, device 200 may apply smoothing logic to one or more segments of handwritten objects 740. Smoothing logic may alter connecting touch paths to provide a more visually pleasing result on the device display. Application of smoothing logic may be an optional feature.

Converted objects 750 may include handwritten objects that have been converted to digital text using handwriting recognition software (e.g., handwriting recognition logic 420) operating, for example, on processor 300 of device 200. Converted objects 750 may be stored/recognized as fonts, images, and/or metadata to be associated with the information/application within display window 720. For example, as shown in FIGS. 7A-7B, converted objects 750 may be associated with image 710 and stored as metadata with image 710. In other implementations, converted text 750 may be recognized by device 200 as characters, words, symbols, and/or commands provided by a user. In some implementations, device 200 may 'learn' handwritten objects 740 from a user and associate those objects with particular converted objects 750.

Magnification controls 760 may include one or more command icons or other menu controls to facilitate magnification of handwriting input window 730. For example, while a default magnification for handwriting input window 730 may be 400 percent of the original or default size for objects in display window 720, magnification controls 760 may allow a user to select a different magnification for handwriting input window 730. In one implementation, magnification controls 760 may allow a user to increase/decrease magnification between typical intervals (e.g., 50%, 75%, 100%, 150%, 200%, 400%, 800%, 1200%, etc.). In other implementations, magnification controls 760 may include gesture-based commands or menus selections for a particular magnification level.

Character recognition tools 770 may include one or more menu options for assisting in handwriting recognition of handwritten objects 740. For example, character recognition tools 770 may include suggested characters, suggested words, suggested symbols, and/or suggested commands. In some implementations, character recognition tools may also include text formatting features for digital text. In other implementations, character recognition tools 770 may also include data type indicators to allow, for example, a user to indicate whether the digital text is intended as metadata, visible text, a command, etc.

Display lock icon 780 may include one or more menu options to allow a user to keep handwriting input window 730 displayed after a touch is removed for more than the particular touch remove interval. For example, display lock icon 780 may include a single icon that may be selected to toggle handwriting input window 730 between locked and unlocked modes. When in a locked mode, handwriting input window 730 may continue to display a magnified view and be manipulated with other commands (e.g., magnification controls 760, character recognition tools 770, pan controls 790, etc.). When in unlocked mode, handwriting input window 730 may toggle between handwriting input window 730 and display window 720 based on particular intervals between touches, as described above in connection with, for example, display window 120 and handwriting input window 130 of FIGS. 5A-5C.

Pan controls 790 may include one or more command icons or other menu controls to facilitate relocating the magnified portion of handwriting input window 730 with respect to display window 720. In one implementation, pan controls 790 may include arrows or other indicators that may be selected to adjust the view within handwriting input window 730. In other implementations, pan controls 790 may include a tool to 'grab' a displayed image/object and reposition its view within handwriting input window 730.

Although FIGS. 7A-7B show an exemplary handwriting interface 100, in other implementations, handwriting interface 100 may contain fewer, different, differently arranged, or additional items than depicted in FIGS. 7A-7B.

Systems and/or methods described herein may present, on a touch-sensitive display, an application display window and detect a touch on the application display window. A handwriting input window may be displayed based on the touch on the application display window. The handwriting input window may include a magnified view of a portion of the application display window and may be substantially centered at the location of the touch. The systems and/or methods may further detect a touch path input within the handwriting input window and display the touch path input within the handwriting input window. The systems and/or methods may also recognize that the touch path input has been removed from the handwriting input window and present, on the touch-sensitive display, the application display window including the displayed touch path input, after the handwriting input window has been removed.

The foregoing description of implementations provides illustration and description, but is not intended to be exhaustive or to limit the invention to the precise form disclosed. Modifications and variations are possible in light of the above teachings or may be acquired from practice of the invention.

For example, while implementations have been described primarily in the context of a touch-screen enabled mobile device (such as a radiotelephone, a PCS terminal, or a PDA), in other implementations the systems and/or methods described herein may be implemented on other touch-screen computing devices such as a laptop computer, a personal computer, a tablet computer, an ultra-mobile personal computer, or a home gaming system.

Also, while a series of blocks has been described with respect to FIG. 6, the order of the blocks may be modified in other implementations. Further, non-dependent blocks may be performed in parallel.

It will be apparent that aspects described herein may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware may be designed to implement these aspects based on the description herein.

Further, certain portions, described herein, may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing-device implemented method comprising:
displaying, by the computing device, an application display window,
the application display window including a screenshot of text, and
the application display window being to receive a handwriting input from a user of the computing device;
detecting, by the computing device, a touch within the application display window on a surface of a touch screen of the computing device,
the touch corresponding to the handwriting input;
displaying, by the computing device, an enlarged window based on detecting the touch within the application display window,
the enlarged window including an enlarged view of a portion of the text of the application display window, and
the application display window including a background that is enlarged proportionately with the portion of the text of the application display window;
receiving, on the surface of the touch screen, a touch path input within the enlarged window;
recognizing, by the computing device, that the touch path input has been removed from the enlarged window;
determining, by the computing device, that the touch path input has been removed for a time period exceeding a particular touch removal interval; and
displaying, on the touch screen, the application display window, including the touch path input, after the enlarged window has been removed.

2. The computing device-implemented method of claim 1, further comprising:
receiving a command to activate a text-entry mode, the command including one of:
user input via a control button, or
user input via the touch screen.

3. The computing device-implemented method of claim 1, further comprising:
determining, by the computing device, a location of the touch on the surface of the touch screen, where the displaying the enlarged window is based on the location of the touch on the surface of the touch screen.

4. The computing device-implemented method of claim 1, further comprising:
determining that panning of the enlarged window is required based on a last location of the touch path input.

5. The computing device-implemented method of claim 1, where the touch screen is a capacitive touch screen.

6. The computing device-implemented method of claim 1, further comprising:
converting the touch path input to digital text.

7. The computing device-implemented method of claim 1, further comprising:
applying smoothing logic to the touch path input.

8. The computing device-implemented method of claim 1, where the enlarged view of the portion of the application display window provides magnification to enable fingertip text entry by a user.

9. The computing device-implemented method of claim 8, where the enlarged view of the portion of the application display window is magnified at least two times larger than an original size for objects in the application display window.

10. A device comprising:
a memory to store a plurality of instructions;
a touch-sensitive display; and
a processor to execute instructions in the memory to:
display, on the touch-sensitive display, an application display window,
the application display window including a screenshot of text, and
the application display window being to receive a handwriting input from a user of the device,
detect a touch on the application display window,
display, based on detecting the touch, an enlarged window within the application display window,
the enlarged window including a magnified view of a portion of the text of the application display window, and
the application display window including a background that is magnified proportionately with the portion of the text of the application display window,
detect a touch path input within the enlarged window,
display the touch path input within the enlarged window,
recognize that the touch path input has been removed from the enlarged window,
remove the enlarged window, and
present, on the touch-sensitive display and after removing the enlarged window, the application display window including the displayed touch path input.

11. The device of claim 10, where the processor further executes instructions in the memory to:
determine that the touch path input has been removed for a time period exceeding a particular time interval.

12. The device of claim 10, where the processor further executes instructions in the memory to:
detect a location of the touch path input;
determine that panning of the enlarged window is required based on the location of the touch path input; and
center the enlarged window based on a projected next touch path input location.

13. The device of claim 10, where the magnified view of the portion of the text of the application display window provides magnification to enable fingertip text entry by a user.

14. The device of claim 10, where the processor further executes instructions in the memory to:
activate a text-entry mode for the application display window, where the text entry mode enables automatic magnification of a portion of the application display window when the touch is detected on the application display window.

15. The device of claim 10, where the application display window includes an interface for:
a Multimedia Messaging Service (MMS) application,
an email application,
a word processing application,
a game application,
an image-viewing application,
a document-viewing application,
a map application,
a desktop note application, or
a text message application.

16. The device of claim 10, where the enlarged window includes one or more of:
   a magnification control,
   a character recognition tool,
   a display lock, or
   a panning control.

17. The device of claim 10, where the processor further executes instructions in the memory to:
   convert the touch path input to text.

18. A non-transitory computer-readable storage medium storing instructions, the instructions comprising:
   one or more instructions which, when executed by at least one processor, cause the at least one processor to:
      display an application display window,
         the application display window including a screenshot of text, and
         the application display window being to receive a handwriting input from a user;
      detect a touch within the application display window of a touch screen,
      the touch corresponding to the handwriting input;
      provide, for display, an enlarged window based on the touch within the application display window,
         the enlarged window including an enlarged view of a portion of the text of the application display window, and
         the application display window including a background that is enlarged proportionately with the portion of the text of the application display window;
      receive a touch path input within the enlarged window;
      recognize removal of the touch path input;
      remove, based on recognizing removal of the touch path input, the display of the enlarged window; and
      provide, for display, the application display window, including the touch path input, after the display of the enlarged window has been removed.

19. The medium of claim 18, where the instructions further comprise:
   one or more instructions to provide, for display, the touch path input within the enlarged window.

20. The medium of claim 18, where the instructions further comprise:
   one or more instructions to detect a location of the touch path input;
   one or more instructions to determine that panning of the enlarged window is required based on the location of the touch path input; and
   one or more instructions to center the enlarged window based on a projected next touch path input location.

* * * * *